United States Patent Office 3,822,133
Patented July 2, 1974

3,822,133
PHOTOSENSITIVE MATERIALS SENSITIZED WITH A SUBSTITUTED ISOALLOXAZINE
Glyn David Short and Jan Willem Frederik van Ingen, Runcorn, England, assignors to Imperial Chemical Industries Limited, London, England
No Drawing. Filed May 22, 1972, Ser. No. 255,636
Claims priority, application Great Britain, May 21, 1971, 16,242/71
Int. Cl. G03c 1/00
U.S. Cl. 96—88                                                4 Claims

ABSTRACT OF THE DISCLOSURE

Photosensitive materials, of the type such as bipyridylium, biquinolinium and diazapyrenium, are sensitized with a substituted isoalloxazine, such as riboflavin.

---

This invention relates to photosensitive materials. More particularly it relates to the use of sensitisers for increasing the range of wavelengths of light to which certain photosensitive materials respond.

In our copending British applications 57,862/69 and 25,203/70 we describe photosensitive material in which photosensitivity is conferred by the presence of salts of the general formula I and substituted derivatives thereof,

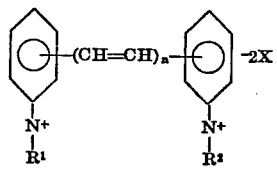

I where $R^1$ and $R^2$ are organic groups, $n=0$ or an integer and $X^-$ is an anion deived from a strong acid (pKa preferably $<2.5$).

Typical compounds of this type are salts of bipyridylium, biquinolinium and diazapyrenium.

We describe how these salts may be supported in polymers which the water permeable, preferably water soluble, to form films which respond to ultraviolet and short wavelength visible radiation, and also to electron beams.

We also described how certain sensitizers may be incorporated into the film, and the use of riboflavin is mentioned.

We have now found that beside riboflavin, other isoalloxazine derivatives may be used, many of which have advantages over riboflavin. The principal advantage of most compounds to be described is that they have greater solubility in water, particularly in aqueous solutions of polyvinyl alcohol, allowing higher concentrations to be introduced into the film. Many have the advantage of greater efficiency than riboflavin and some compounds modify the spectral response of the finished film.

The isoalloxazine nucleus is defined by structure II and the numbering system used in this specification shown thereon.

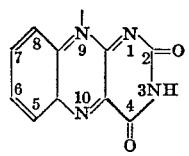

II

Riboflavin is the 6,7-dimethyl-9-ribityl derivative.

A preferred group of isoalloxazine compounds for use as sensitizers having greater efficiency and solubility in water than riboflavin, are those compounds in which the 9-position carries a substituent of the structure III or IV.

$$-(CH_2)_m CH_2 - N(R^3)_2 \qquad \text{III}$$

$$-(CH_2)_m CH_2 - N^+(R^3)_3 X^- \qquad \text{IV}$$

where $R^3$, each of which may be the same or different, is hydrogen or an alkyl group, preferably containing from 1 to 6 carbon atoms X is an anion, and $m=0$, 1 or 2. X is chosen such that it does not induce precipitation of the photosensitive salt and preferably is $Cl^-$, $F^-$, oxalate, methosulphate, $Br^-$.

Another preferred group are derivatives of riboflavin containing a phosphate group, for example riboflavin-5-acetyl phosphate and riboflavin phosphate.

The substituents on the 5, 6, 7, and 8 positions on the isoalloxazine nucleus may be varied considerably, for example, by selection from hydrogen, halogen, alkyl, especially methyl and ethyl, halo-alkyl, especially halomethyl, aryl or acyl, carboxylic acid or sulphonate.

Suitable amounts of sensitiser are 500 to 10 parts by weight per 1000 parts of the salt of structure I. The sensitiser is conveniently utilised by dissolving the salt, sensitiser and a water soluble polymer in water, and casting films therefrom onto an inert base support material, e.g. glass or film base, such as cellulose triacetate or polyester. The water is evaporated off. Polyvinyl alcohol is the preferred water soluble polymer, though others, e.g. gelatine, polyvinylpyrrolidone or alginates may also be used.

The invention is illustrated by the following Examples in which parts are by weight. According to a general procedure, solutions were made up of

| | Parts |
|---|---|
| N:N'(bis p-cyanophenyl) 4,4'-bipyridylium chloride | 1.0 |
| Isoalloxazine compound | 0.5 |
| Polyvinyl alcohol | 10 |
| Glyoxal | 0.5 |

Water to 100 parts.

Sufficient of the solution was spread onto cellulose triacetate (0.125 mm. thick) as film base, to form a film 3.0 microns thick after drying in a dust free atmosphere. Film sensitivity was tested by exposure under standardised conditions to radiation of wavelength 436 nm. (blue), a region of the spectrum in which unsensitised film is insensitive. The image as formed was developed in a silver physical developer of the composition described below, and the optical density of the resulting silver image was measured.

0.15M Ferrous Ammonium Sulphate
0.08M Ferric Nitrate
0.05M Silver Nitrate
0.1M Citric Acid
0.02% Armac 12D*
0.02% Lissapol N*
Temp. 20° C., time 100 secs.

The isoxalloxazine compounds in the Examples are described in terms of the substituents attached to structure II at the 5, 6, 7, 8 and 9 positions.

Optical densities of the developed film are given in the following Table. In the comparative example (*), no sensitiser was used. In the comparative example (**), the sensitiser was riboflavin.

*Registered trademarks.

| Ex. No. | Substituents on 11 | | | | Optical density of exposed film | Solubility of 11 (per cent wt.) in PVA solution |
|---|---|---|---|---|---|---|
| | 5– | 6– | 7– | 8– 9– | | |
| (*) | | | | (No position) | 0 | |
| (**) | H | CH₃ | CH₃ | H  —CH₂(CHOH)₃CH₂OH | 0.22 | <0.2 |
| 1 | H | H | H | H  (CH₂)₂N⁺(C₂H₅)₃CH₃(CH₃SO₄⁻) | 2.06 | >0.4 |
| 2 | H | H | CH₃ | H  (CH₂)₂N(C₂H₅)₂ | 0.24 | >0.4 |
| 3 | H | Cl | Cl | H  (CH₂)₂N⁺(C₂H₅)₃HCl⁻ | 1.21 | >0.4 |
| 4 | H | Cl | Cl | H  (CH₂)₂N(C₂H₅)₂ | >2.23 | >0.4 |
| 5 | H | Cl | H | H  (CH₂)₂N⁺(C₂H₅)₃HCl⁻ | >2.23 | >0.4 |
| 6 | H | Br | H | H  (CH₂)₂N⁺(C₂H₅)₃HCl⁻ | 2.33 | >0.4 |
| 7 | H | Cl | H | H  (CH₂)₂N⁺(C₂H₅)₂CH₃Cl⁻ | >2.23 | >0.4 |
| 8 | H | H | H | H  (CH₂)₂N⁺(C₂H₅)₃H₃ClC⁻ | >2.23 | >0.4 |

What we claim is:

1. A photosensitive composition comprising a salt of the formula:

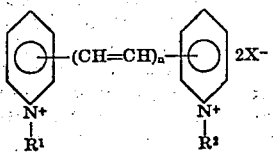

where R¹ and R² are organic groups, $n=0$ or an integer and X⁻ is an anion derived from a strong acid and, as a sensitizer therefor, a substituted isoalloxazine of the formula:

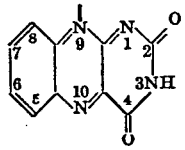

said isoalloxazine carrying in the 9-position the grouping

or

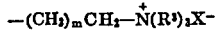

where R³, each of which may be the same or different, is hydrogen or an alkyl group, X is an anion, and $m=0$, 1 or 2.

2. A composition according to claim 1 in which the substituted isoalloxazine is present in an amount forming 500 to 10 parts by weight per 1000 parts of the salt of structure I.

3. A composition according to claim 1 in the form of a film on a support.

4. The composition of claim 1 wherein R³ is an alkyl of from 1–6 carbon atoms.

References Cited

UNITED STATES PATENTS 3,671,250   1/1972   Andrews _____ 96—88
3,326,687   6/1967   Kalenda _____ 96—101

CHARLES L. BOWERS, Jr., Primary Examiner

J. L. GOODROW, Assistant Examiner

U.S. Cl. X.R.

96—101